Jan. 19, 1943.    L. F. NENNINGER ET AL    2,308,708
MILLING MACHINE TRANSMISSION AND CONTROL MECHANISM
Filed Sept. 9, 1939    4 Sheets-Sheet 1

INVENTOR.
LESTER F. NENNINGER
FRED A. HASSMAN
BY
H. K. Parsons
ATTORNEY.

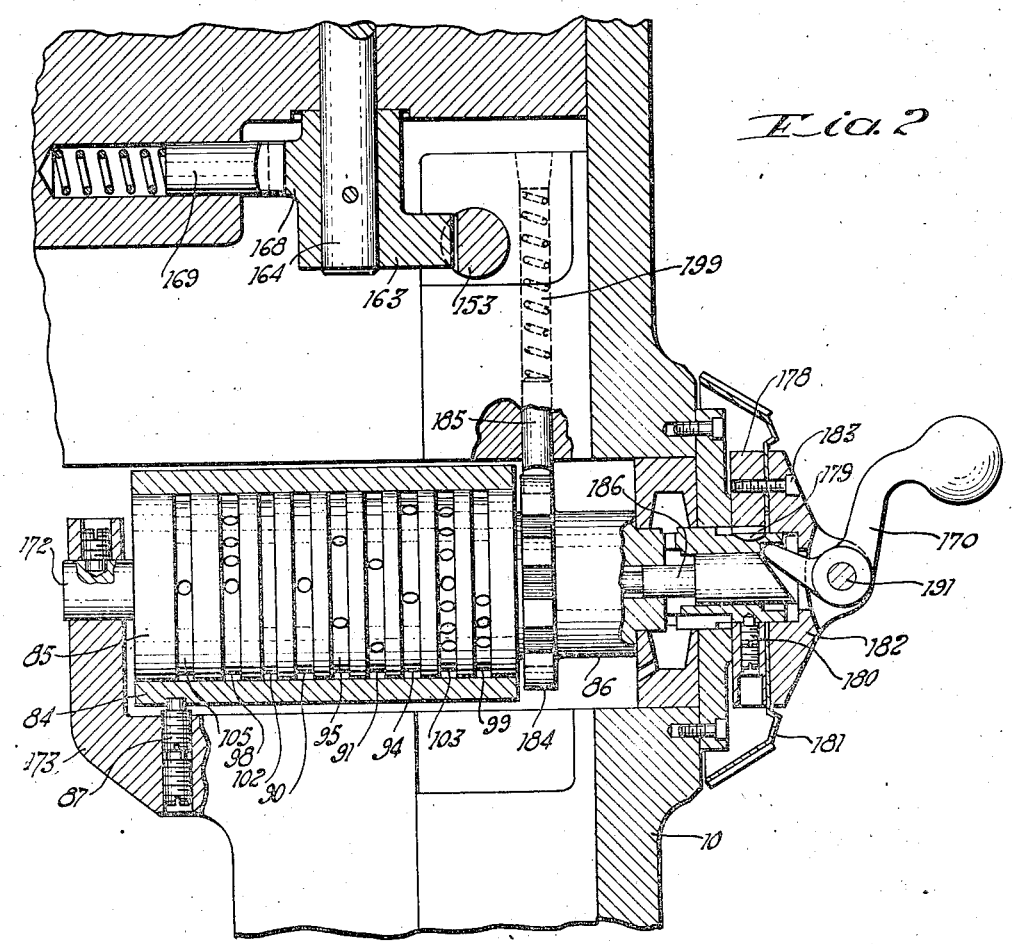

Jan. 19, 1943. L. F. NENNINGER ET AL 2,308,708
MILLING MACHINE TRANSMISSION AND CONTROL MECHANISM
Filed Sept. 9, 1939 4 Sheets-Sheet 3

Fig. 3

INVENTOR.
LESTER F. NENNINGER
FRED A. HASSMAN
BY  H H Parsons
ATTORNEY.

Jan. 19, 1943.　　L. F. NENNINGER ET AL　　2,308,708
MILLING MACHINE TRANSMISSION AND CONTROL MECHANISM
Filed Sept. 9, 1939　　4 Sheets-Sheet 4
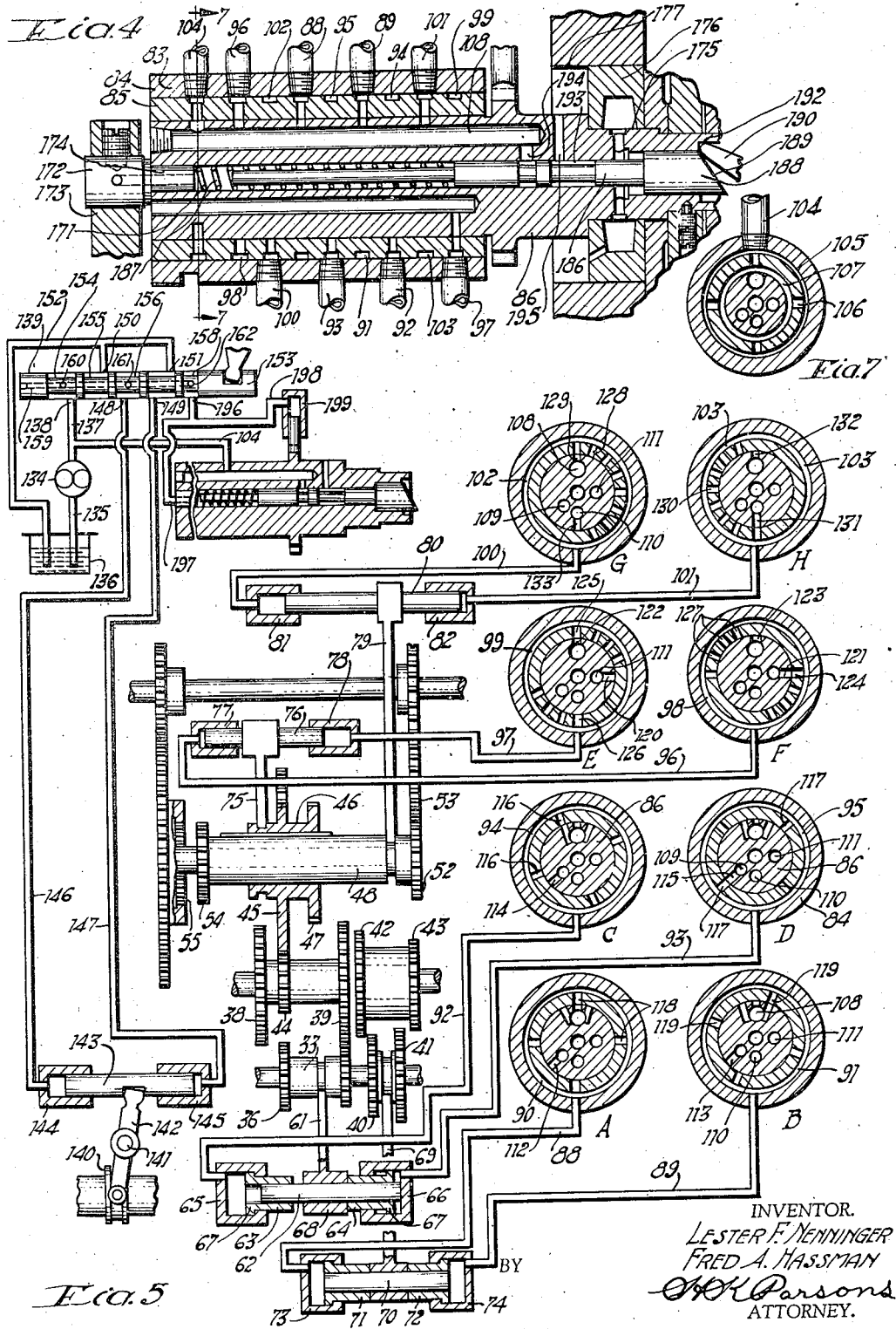
INVENTOR.
LESTER F. NENNINGER
FRED A. HASSMAN
BY
ATTORNEY.

Patented Jan. 19, 1943

2,308,708

UNITED STATES PATENT OFFICE 2,308,708

MILLING MACHINE TRANSMISSION AND CONTROL MECHANISM

Lester F. Nenninger and Fred A. Hassman, Cincinnati, Ohio, assignors to The Cincinnati Milling Machine Co., Cincinnati, Ohio, a corporation of Ohio Application September 9, 1939, Serial No. 294,194

12 Claims. (Cl. 90—18)

This invention relates to milling machines and more particularly to an improved variable speed transmission and control mechanism therefor.

One of the objects of this invention is to provide an improved and compact variable speed transmission for the spindle of a milling machine.

Another object of this invention is to provide an improved hydraulically operated speed change control mechanism for a variable speed transmission of a milling machine.

A further object of this invention is to provide improved interlocks between the power application control and the speed change control whereby the speed of the transmission cannot be varied during application of power thereto and/or full power cannot be applied to the transmission during speed selection.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a side elevation of a milling machine embodying the principles of this invention.

Figure 2 is a section through the speed selector valve and control mechanism therefor as viewed on the line 2—2 of Figure 1.

Figure 3 is an expanded view of the variable speed transmission for the spindle of the machine.

Figure 4 is a cross sectional view through the selector valve shown in Figure 2.

Figure 5 is a diagrammatic view of the hydraulic control circuit for the variable speed transmission.

Figure 7:
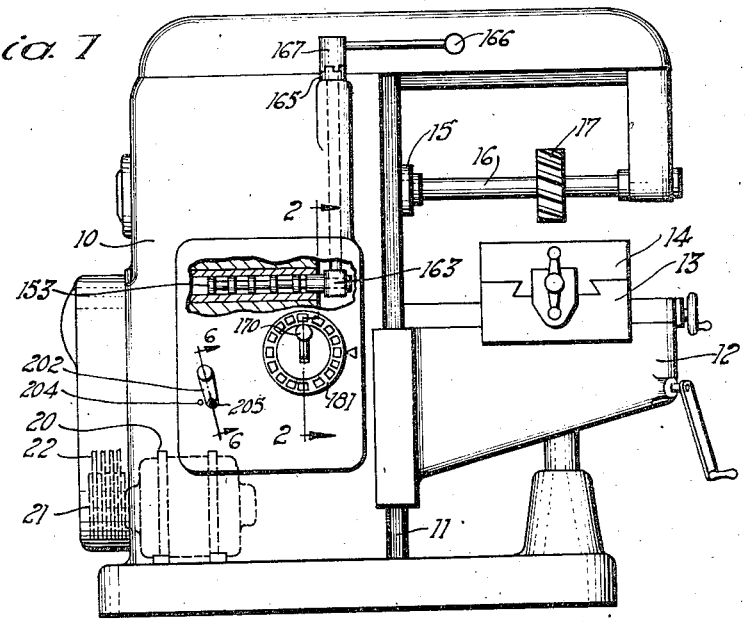
Figure 7 is a detail section on line 7—7 of Figure 4.

The demands of industry for a milling machine having high maximum spindle speeds, a large variation of speed, and easy and quick selection of a desired speed has been met to a certain extent in the larger types of milling machines where the necessary space is available for incorporating these features. It is more difficult to obtain these desirable features in the smaller types of milling machines because of the lack of space. This invention attempts to solve the problem by providing an improved and more compact variable speed transmission which will still yield the same number of speed changes that larger transmissions provide, together with power shifting means for the speed change elements under manual control, and in which competent interlocks are provided between the power application control and the speed change control to prevent simultaneous power operation during speed selection.

Referring to Figure 1 of the drawings there is depicted a conventional knee and column type milling machine having a column 10 upon which is formed vertical guideways 11 for guiding the vertical movement of a knee 12. The knee supports a saddle 13 for crosswise movement toward and from the column, while the saddle in turn supports a table 14 for movement parallel to the face of the column. A cutter spindle 15 is journaled in the upper part of the column for driving an arbor 16 upon which is fixed a cutter 17.

The transmission for the spindle is shown in expanded view in Figure 3 of the drawings to which reference may now be had. The transmission has a main shaft 18 to which is keyed a driving pulley 19 which is rotated by a motor 20 located in the base of the column through a motor pulley 21 and multiple V belts 22.

The shaft 18 has a gear 23 fixed thereto which drives gear 24, these two gears constituting a gear pump for supplying fluid pressure to the control circuit shown in Figure 5.

The shaft 18 terminates in one-half 25 of a friction disc clutch, indicated generally by the reference numeral 26. The other half 27 of the clutch is shifted by a spool 28 to effect application of power to the drive gear 29 which is keyed to the part 27.

The gear 29 rotates an idler gear couplet 30 which constitutes means for reversing the direction of rotation of the spindle. This is accomplished through a shiftable gear 31 which is splined on a shaft 32 and movable toward the right as viewed in Figure 3 for direct engagement with the gear 29 to effect one direction of rotation of the spindle and to the left for engagement with the idler gear to effect the opposite direction of rotation of the spindle.

Figure 6:
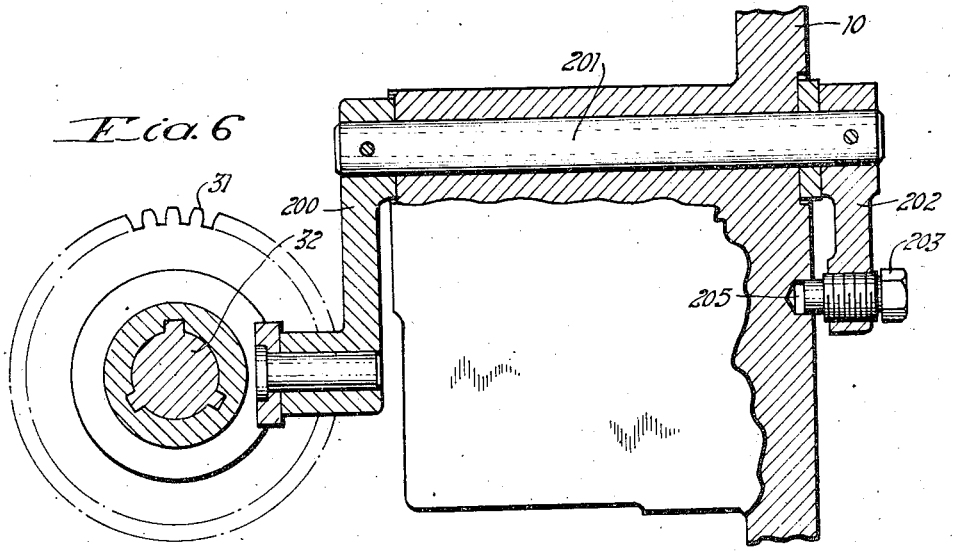
Figure 6 is an enlarged detail section on line 6—6 of Figure 1, showing reverser actuator.

The gear 31 is shifted by shifter lever 200 attached to the end of shaft 201 as shown in Figure 6. This shaft extends through the side wall of the column 10 and is provided with a manual operating lever 202. A locking screw 203 is threaded in the end of the lever for selective insertion in holes 204, 205 drilled in the column wall for positively locking the reversing gear in desired position.

The shaft 32 has two gear couplets 33 and 34 slidably splined thereon for imparting four different rates of rotation to shaft 35. The couplet 33 includes gears 36 and 37 selectively shiftable into mesh with gears 38 and 39 respectively, while the couplet 34 comprises gears 40 and 41 selectively shiftable into mesh with gears 42 and 43 respectively. These gears are made progressively larger in the order 37, 36, 40 and 41 whereby four different rates of rotation may be imparted to the shaft 35.

The gears 38, 39, 42 and 43 are all fixed on the shaft 35, as well as an additional gear 44 which is selectively engageable by a shiftable gear 45 of a gear couplet 46. This couplet also has a gear 47 which is selectively engageable with the gear 39.

Thus, the couplet 46 may be driven at eight different speeds. The couplet 46 is telescopingly splined on an elongated sleeve 48 which, in turn, is telescopingly splined on a shaft 49.

The sleeve 48 is splined on the shaft 49 so that no relative rotation takes place between the sleeve and the shaft, the shaft being anti-frictionally journaled at 50 and 51 in the column.

The sleeve 48 is formed on one end to provide an integral gear which is shiftable into mesh with the large or low speed gear 53 which is fixed to the spindle 15. The other end of the sleeve is formed to provide peripheral clutch teeth 54 which are interengagable with internal clutch teeth 55 formed on annular rib 56 of gear 57.

The gear 57 permanently meshes with high speed pinion 58 affixed to the spindle 15 adjacent the rear bearing 59 of the spindle. The gear 57 is supported by an anti-friction bearing 60 on the shaft 49 for independent rotation relative thereto. Thus, the sleeve 48 may be selectively shifted to effect engagement of gear 52 with gear 53, or to effect interengagement of the clutch teeth 54 and 55 whereby the spindle may be driven at two different series of speeds.

Attention is invited to the fact that by splining the gear couplet 46 on the sleeve 48 for independent relative shifting it becomes possible to reduce the number of supporting shafts which would be necessary if conventional practice were followed, thereby providing a more compact transmission arrangement.

In addition, the sleeve 48, being of considerable length so as to extend throughout the major portion of the unsupported part of shaft 49, serves to reinforce the shaft, making the same more rigid as respects bending, and since the two are keyed together the torsional resistance also increases. It will now be apparent that the shiftable elements 33, 34 and 46 are capable of producing eight different speeds which are transmittable to the spindle through the sleeve 48 in two different series, making a total of 16 different speeds selectively available for driving the spindle.

Fluid operable shifters have been provided for the various shiftable elements of the transmission and these have been diagrammatically illustrated in Figure 5, together with the necessary hydraulic control connections. As shown in this figure the gear couplet 33 is provided with a shifter fork 61 which is attached to a piston rod 62.

The piston rod is slidably supported in sleeves 63 and 64, which, in turn, are slidable in cylinders 65 and 66 respectively. The sleeves are provided with annular ribs 67 to form shoulders which are engagable with the ends of the cylinders to limit the movement of the sleeves toward one another.

The length of the sleeves and the length of the boss 68 of the shifter fork 61 are made of such length that when pressure is admitted simultaneously to both cylinders 65 and 66, the opposing ends of the sleeves will engage opposite ends of the boss 68 when both shoulders are in engagement with opposing ends of the cylinders.

This will place the shiftable gear couplet 33 in a central or neutral position in which both the gears 36 and 37 are out of mesh with their mating gears 38 and 39. On the other hand, when pressure is admitted to cylinder 65, for instance, and cylinder 66 is connected to exhaust, the piston rod 62 is free to move under pressure toward the right and relative to sleeve 63 to effect engagement of the gear 37 with gear 39; while if the reverse connections are made and pressure is admitted to cylinder 66, the piston rod 63 moves toward the left a sufficient distance to effect engagement of the gear 36 with the gear 38. Thus, it is possible by this combination of parts to effect three positions of the gear couplet 33.

The same form of shifting mechanism is provided for the gear couplet 34 comprising the shifter fork 69, connected piston rod 70, and sleeves 71 and 72 which are slidable in cylinders 73 and 74 respectively.

The gear couplet 46 is provided with a shifter fork 75 which is attached to a piston 76 slidably mounted at opposite ends in cylinders 77 and 78. Likewise the sleeve 48 is provided with a shifter fork 79 which is attached to a piston rod 80, and is slidably mounted at opposite ends in cylinders 81 and 82.

The various shifter cylinders are all hydraulically connected to a common rotatable selector valve shown in Figure 4 and indicated generally by the reference numeral 83.

This valve has an outer cylindrical member made up of two telescoping sleeves 84 and 85 which are fixed together and supported by the rotatable valve member 86. This outer cylinder floats on the valve member and is held against rotation by a set screw 87 as more particularly shown in Figure 2. The various gear shifter cylinders are connected by channels to the outer sleeve 84 of the selector valve, and the terminus of each channel lies in a separate plane and is in continuous communication with a separate annular groove formed on the inner sleeve 85. This makes it possible to independently control the flow of fluid to or from each channel. Thus, the cylinders 73 and 74 are connected by channels 88 and 89 to the outer sleeve 84 and are in continuous communication with annular grooves 90 and 91 respectively.

The cylinders 65 and 66 are connected by channels 92 and 93 to the sleeve 84 and are in communication with grooves 94 and 95 respectively. The cylinders 77 and 78 are connected by channels 96 and 97 to the outer sleeve 84 and are in continuous communication with grooves 98 and 99. The cylinders 81 and 82 are connected by channels 100 and 101 to the outer sleeve and are in continuous communication with grooves 102 and 103 respectively. The outer sleeve also has a pressure supply channel 104 connected thereto in continuous communication with an annular groove 105. The groove 105 has a series of radial ports 106 which maintain communication with an annular groove 107 formed in the periphery of the valve member 86.

The groove 107 intersects a longitudinal bore 108 formed in the valve member 86 and this bore serves to deliver pressure through various ports to the channels leading to the gear shifter cylinders in selected manner to be determined by the rotatable position of the valve member. The valve member 86 is also provided with three additional longitudinal bores 109, 110 and 111 which are blind at one end and open to the atmosphere at the other end to serve as a drain or reservoir connection for the various channels connected thereto.

The variable speed transmission is capable of yielding sixteen different speeds and therefore the selector valve has sixteen different positions spaced 22½ degrees apart whereby one revolution of the selector valve can produce the complete range of sixteen speeds.

The selector valve is illustrated in Figure 5 in a position to produce the lowest speed of the transmission.

It will be noted that the porting arrangement in each cross section of the lower four cross sections of the valve member 86 are exactly the same. In each of these cross sections, indicated by the letters A, B, C and D, the pressure bore 108 is intersected by three radial ports, the terminii of which are spaced 22½ degrees.

The exhaust bore 109 is intersected by radial ports 112, 113, 114 and 115. The annular groove 94 is provided with four equally spaced radial ports 116, the annular groove 95 with four equally spaced radial ports 117, the annular groove 90 with four equally spaced radial ports 118 and the annular groove 91 with four equally spaced radial ports 119.

It will be noted that beginning with the radial ports 118 in section A that the radial ports 116, 117, and 119 in the order named are spaced 22½ degrees, 45 degrees and 67½ degrees respectively in a counterclockwise direction from the radial plane of port 118. It will be noted from the position of the parts that pressure is connected through ports 116, 118 and 119 to cylinders 65, 73 and 74 respectively and that cylinder 66 is connected through registering ports 117 and 115 to the exhaust channel 109. The result is the central positioning of the gear couplet 34 and the shifting of gear couplet 33 to effect engagement of gear 37 with gear 39.

As the valve member 86 is rotated in a clockwise direction it will effect successively interconnection of port 114 with port 116 whereby cylinder 65 is connected to exhaust to effect engagement of gear 36 with gear 38; port 112 is connected with port 118 thereby connecting cylinder 73 to reservoir effecting engagement of gear 40 with gear 42; and port 113 is connected to port 119 connecting cylinder 74 to reservoir and effecting engagement of gear 41 with gear 43.

With the exception of the cylinder which is connected to reservoir, the remaining three cylinders are connected to pressure in each of these positions. It will be noted that the four positions of the primary gears can be effected in a quarter revolution of the selector valve and these positions are repeated for each quarter revolution of the valve. In sections E and F of the selector valve, the exhaust bore 111 for connecting cylinders 77 and 78 to reservoir has a radial port 120 in section E, and a port 121 in section F, while the pressure bore 108 has a port 122 in section E and a port 123 in section F.

The groove 98 in the sleeve 85 has four radial ports 124 spaced 22½ degrees and successively connectible to exhaust port 121 during the first quarter revolution of the selector valve, while the annular groove 99 has a group of four radial ports 125 which are successively connectible to pressure port 122 during the first quarter revolution of the selector valve whereby the couplet 46 will remain in the position shown, while the primary gears are being successively shifted to their four different positions.

During the next one quarter revolution, the exhaust port 120 is successively connected to another group of four radial ports 126 whereby cylinder 78 is connected to reservoir, and cylinder 77 connected to pressure through interconnection of pressure port 123 with the radial ports 124.

This results in the gear 47 being meshed with gear 39 during the next cycle of shifting of the primary gears. During the third quarter of revolution of the selector valve the pressure port 122 is in communication with the radial ports 126, and the exhaust port 121 is in communication with the four radial ports 127 whereby the gear 45 is in mesh again with the gear 44. During the last one-quarter revolution of the valve the port 120 is in communication with the ports 125 and the pressure port 123 is in communication with the radial ports 127 whereby the gear 47 is in mesh with the gear 39. Thus, upon each one-quarter revolution of the selector valve the position of the gear couplet 46 is changed.

The annular groove 102 in section G of the selector valve has a series of eight radial ports 128 drilled therein and the pressure bore 108 has a radial port 129 which registers with the ports 128 during the first one-half revolution of the selector valve whereby pressure is delivered to cylinder 81 and the gear 52 is held in mesh with gear 53. The cylinder 82 is connected to reservoir during this time by means of a series of radial ports 130 formed in the groove 103 and the exhaust port 110. During the second one-half revolution of the selector valve the pressure port 132 registers with the ports 130 and an exhaust port 133 registers with the ports 128 whereby the gear 52 is withdrawn from mesh with the gear 53 and the clutch members 54 and 55 are interengaged to drive the spindle at a high series of speeds.

The channel 104 is continuously supplied with hydraulic pressure by the continuously rotating gears 23 and 24 which constitute a gear pump and indicated generally by the reference numeral 134. The pump has an intake 135 through which fluid is withdrawn from a reservoir 136 formed in the base of the column, and a delivery channel 104 which leads to the selector valve. A branch channel 137 leads to port 138 of a start and stop control valve 139. The start and stop control valve serves to control the shifting of spool 28 and thereby engagement or disengagement of the friction disc starting clutch. The spool 28 is operated by a shifter fork 140 which is pivoted at 141 and connected by a crank 142 to an operating piston 143. The piston slides in cylinders 144 and 145 which are connected by channels 146 and 147 respectively to ports 148 and 149 of the start and stop control valve 139.

This valve has a pair of exhaust ports 150 and 151 which are connected by a common return channel 152 to the reservoir 136. The plunger 153 of the control valve 139 has a series of annular grooves 154, 155, 156, 157 and 158 formed in the periphery thereof, and an axial bore 159 which communicates through radial ports 160, 161 and 162 with annular grooves 154, 156 and 158. The pressure port 138 is in constant communication with annular groove 154 whereby fluid will flow through the interdrilling in the plunger to annular grooves 156 and 158.

Thus, with the plunger in the position shown, the port 148 is connected to pressure and the spool 28 is in a shifted position to effect engagement of the clutch. The cylinder 145 is connected to exhaust through interconnection of ports 149 and 151 through annular groove 157. When the plunger 153 is shifted to the right, port 148 is connected to exhaust port 150 and port 149 is connected to the pressure groove 156 whereby the spool 28 is shifted to a disengaged position.

Referring to Figure 2, the valve plunger 153 is operated by a crank 163 attached to the lower end of an oscillatable rod 164. This rod extends upward to the top of the column as shown in Figure 1 where it is provided with a clutch member 165. An operating lever 166 is supported for free rotation on the upward extension of the rod 164 and is provided with clutch teeth 167 for engagement with the clutch member 165. This clutch arrangement serves to change the operating position of the control lever 166 to suit the convenience of the operator.

In order to assist the operator in properly positioning the start and stop valve, the crank 163 is provided with detent notches 168 and a spring pressed detent 169 provided for engaging these notches and holding the valve in either of its two positions.

The selector valve 86 is adapted to be manually rotated by the lever 170 shown in Figure 2 and is rotatably supported in the column in the following manner.

The valve is provided with an axial bore 171 as shown in Figure 4, and a plug 172, fixed in a standard 173, has a reduced end 174 which fits in the end of the bore 171. The other end of the valve has a reduced portion 175 which is bearinged in the ring 176 inserted in the bore 177 of the column. A plate 178 is keyed at 179 to the outer end of the valve and additionally secured thereto by a set screw 180. This plate serves to support the speed change dial 181 and the base plate 182 upon which the handle 170 is pivotally connected. This is accomplished by passing screws 183 through the base plate and the dial and threading the screws in the plate 178. To assist in correct positioning of the selector valve a 16-notched detent wheel 184 is secured to the valve and a spring pressed detent plunger 185 provided for engaging the detent wheel.

It will be noted from Figure 5 that the pressure bore 108 in the valve extends longitudinally of the valve and that all of the pressure ports lie substantially in one radial plane whereby, when pressure is on the valve, an hydraulic unbalance is created, forcing the valve into frictional engagement with the interior of the sleeve 85 at a point opposite the pressure ports.

This unbalance creates sufficient friction to seriously interfere with manual rotation of the valve. In fact, it is practically impossible to rotate the valve manually without putting excessive strain on the operating parts. Means have, therefore, been provided for reducing the hydraulic unbalance on the valve during manual rotation thereof.

This is accomplished by the same lever 170 which serves to rotate the valve. It is accomplished by inserting a slidable valve member 186 in the axial bore 171 of the valve. An elongated spring 187 is inserted between the end of the valve member 186 and the plug 174, thereby continuously urging the valve member toward the right as viewed in Figures 2 and 4. The valve member is provided with an enlarged head 188 on one end and this head is provided with a beveled face 189 against which an actuating lug 190 is adapted to ride. The lug 190 is part of the lever 170 and therefore the spring 187 serves to continuously urge the lever 170 in a clockwise direction about its pivot 191. Engagement of the lug with the internal bore 192 serves to limit the rotation of the lever. When the lever 170 is rotated counterclockwise by the operator, the lug acting on the bevel face 189 pushes the valve member to the left against the compression of spring 187.

The valve member has an annular groove 193 which when moved to the left will interconnect a radial bore 194, which intersects the pressure bore 108, with a radial exhaust port 195. This permits the fluid in bore 108 to bypass to reservoir, thus forming a direct short circuit from the pump to reservoir, lowering the pressure in the entire system. While the by-pass valve is held in this position it is rotated by the lever 170 to the desired speed position and then the lever 170 is released whereby the valve returns to the right, closing port 194 and permitting pressure to build up again in the system and effect the desired shifting of gears.

In order to insure against inadvertent operation of the gear shifting mechanism during power actuation of the transmission an interlock has been provided for insuring against rotation of the selector valve. This is accomplished by providing a port 196 in the start and stop control valve and connecting this port by channel 197 to the end of the axial bore of the selector valve to prevent axial shifting of the valve member 186 and additionally connecting the port 197 by channel 198 to cylinder 199 in which the detent 185 is slidably mounted. When the start and stop plunger 153 is to the left or in other words in a running position the pressure groove 158 is connected to the port 196 but when the valve is shifted to the right to disengage the starting clutch the port 196 is connected to the exhaust port 151 through the annular groove 157.

It will thus be noted that during power running of the transmission that the interlock prevents operation of the selector valve and that during operation of the selector valve the pressure in the system is reduced to such an extent as to prevent hydraulic actuation of the clutch should the start and stop valve be thrown to its running position.

There has thus been provided an improved transmission and control mechanism for a milling machine which is compact in construction and arrangement, rendering it suitable for small machines, and which offers the advantages of power shifting with suitable safety interlocks between the speed change and the starting control levers.

What is claimed is:

1. In a milling machine having a support, a cutter spindle and a prime mover mounted in the support, the combination of a variable speed transmission for coupling the prime mover for rotation of the spindle at a plurality of speeds including a primary shaft, means for coupling the prime mover for rotation of the shaft in opposite directions, said shaft having a pair of shiftable gear couplets mounted thereon, a secondary shaft supporting a third shiftable gear couplet, an intermediate shaft having a plurality of fixed gears thereon for engagement by the several gears of the couplets for effecting different rates of rotation of the secondary shaft, a sleeve slidably splined on the secondary shaft and spline connected to the third shiftable gear couplet, means for independently shifting the sleeve and the couplet supported thereon, and means responsive to shifting of the sleeve for connecting the third shiftable couplet to the spindle in different speed ratios.

2. In a milling machine having a column including front and rear walls, the combination with a cutter spindle having opposite ends journaled in said walls, of a pinion mounted on said spindle adjacent one of said walls, a large gear mounted on said spindle adjacent the other of said walls, a shaft having a pair of fixed gears thereon, means including a prime mover for driving said shaft at a plurality of different speeds, a second shaft anti-frictionally journaled in the opposing walls of the column in parallel relation to said spindle, a telescoping sleeve and shiftable gear couplet mounted on said shaft, the last-named parts being operatively connected for joint rotation, means for shifting the couplet for selective engagement with said fixed gears to effect rotation of the sleeve at a plurality of speeds, a driving pinion formed integrally on one end of the sleeve, means for shifting the sleeve independently of the couplet and shaft to effect engagement of the last-named pinion with the large gear on said spindle, an additional large gear anti-frictionally supported on the second shaft and meshing with the pinion on said spindle, and clutch means for operatively connecting the sleeve for rotation of the last-named large gear.

3. In a milling machine having a column including front and rear walls and a cutter spindle having its opposite ends journaled in said walls, the combination of a variable speed transmission for driving said spindle including a high speed gear attached to said spindle adjacent one of said walls, a low speed gear attached to said spindle adjacent the other of said walls, a shaft anti-frictionally journaled in the opposing walls of the column in parallel relation to said spindle, a sleeve splined on said shaft and extending throughout the major unsupported length of the shaft, means carried by one end of the sleeve for operative connection to the low speed gear, means carried on the other end of the sleeve for operative connection to the high speed gear, a shiftable gear couplet splined on the sleeve at substantially the mid-portion of the unsupported length of said shaft, a pair of gears rotatably supported for selective engagement by the shiftable couplet, and a prime mover, having variable speed connections for rotating said pair of gears at a plurality of speeds.

4. In a milling machine having a column including front and rear walls and a cutter spindle rotatably supported at opposite ends in said walls, the combination of means for driving said spindle at a plurality of speeds including a high speed gear attached to said spindle adjacent one of said walls, a low speed gear attached to said spindle adjacent the other of said walls, a shaft anti-frictionally journaled in said walls in parallel relation to said spindle, a third gear anti-frictionally journaled on said shaft for free rotation relative thereto and intermeshing with said high speed gear, a sleeve splined on said shaft and extending longitudinally thereof through the major part of the unsupported length of said shaft, a gear pinion integrally formed on one end of the sleeve for shiftable engagement with the low speed gear, clutch means integrally formed on the other end of said sleeve for operative connection with the third gear, and power operable means for driving said sleeve at a plurality of different speeds.

5. In a milling machine having a column including front and rear walls and a cutter spindle having opposite ends journaled in said walls, the combination of means for driving said spindle at different speeds including large and small driven gears mounted on said spindle adjacent the respective walls thereof, a shaft supported in said walls parallel to said spindle, a sleeve splined on said shaft and extending throughout the major portion of the unsupported length of said shaft, a shiftable gear couplet splined on said sleeve, a second shaft having a pair of fixed gears thereon for selective engagement by the gears of said couplet, power operable means for rotating said fixed gears at a plurality of speeds, means integral with the sleeve and responsive to opposite shifting thereof for effecting selective coupling of the sleeve with said large and small driven gears, manually controlled means for shifting said sleeve, and additional means for shifting said couplet independently of the position or movement of the sleeve.

6. In a milling machine having a column including front and rear walls and a cutter spindle journaled at opposite ends in said walls, the combination of means for producing different rates of spindle rotation including a high speed gear and a low speed gear attached to said spindle adjacent the respective column walls, a shaft journaled in said walls in parallel relation to said spindle, a sleeve splined on said shaft, a shiftable gear couplet splined on said sleeve, integral means formed on opposite ends of said sleeve for selective, operative connection with said gears in accordance with the direction of shifting of said sleeve, a pair of variable speed power driven gears, fluid operable means for shifting said sleeve, additional fluid operable means for shifting said couplet into selective engagement with said power driven gears, each of said fluid operable means being effective to prevent movement of its respective shiftable member by friction produced during the relative shifting of the other shiftable member.

7. In a milling machine having a column, a cutter spindle journaled in said column, a prime mover and a shiftable gear variable speed transmission for driving said spindle, the combination of a fluid operated clutch for connecting the prime mover for actuation of the transmission, a fluid operable gear shift mechanism for said transmission including a selector valve, a manually operable control valve, a source of pressure connected to said manually operable valve and to said selector valve, means connecting said clutch to said manually operable valve whereby in one position of said valve the clutch will be engaged and in another position the clutch will be disengaged, and means operable by said valve when in a clutch engaging position to effect hydraulic locking of the selector valve.

8. In a milling machine having a spindle and a variable speed shiftable gear transmission for actuating said spindle, the combination of a hydraulically actuated gear shift mechanism for said transmission for varying the speed of said spindle including a selector valve housing, a rotatable valve plunger mounted in said housing, a source of pressure continuously connected to said housing, a multiplicity of radially arranged ports in the housing and in the plunger for selective connection in various combinations to produce different resultant speeds of said transmission, detent means for determining the various positions of the rotatable plunger, manually operable bypass valve within said plunger for reducing the operating pressure during rotation of the valve, a prime mover, means for effecting connection of the prime mover to the transmission for actuation thereby, said means also causing hydraulic locking of said detent means and of said bypass valve to prevent adjustment of said selector valve during actuation of the transmission.

9. In a milling machine having a cutter spindle, a variable speed transmission for said spindle, a prime mover and a clutch for connecting said prime mover to the transmission, the combination of a hydraulically operated gear shift mechanism for varying the speed of said transmission including a rotatable selector valve, detent means for positioning said valve, a source of pressure, a control valve, and means operable by said control valve for simultaneously coupling said source of pressure for engagement of said clutch and to said detent means for hydraulically locking said selector valve during power actuation of the transmission.

10. In a milling machine having a column including front and rear walls and a cutter spindle journaled at opposite ends in the respective walls, the combination of means for driving said spindle at variable speeds including a large gear mounted on said spindle adjacent one of said walls, a pinion mounted on said spindle adjacent the other wall, a shaft journaled in said walls and supporting a gear in constant mesh with said pinion, a sleeve slidably mounted on the midportion of said shaft and having a pinion on one end for engagement with the large gear on the spindle, clutch means on the other end of the sleeve for operative engagement with the gear supported by said shaft, a second shaft having a plurality of fixed gears mounted thereon, a third shaft having a plurality of gear couplets slidably mounted thereon for selective engagement with the fixed gears, power operable means for driving the third shaft and a slidable gear couplet mounted on said sleeve for selective engagement with some of said fixed gears for driving said sleeve at a plurality of different rates.

11. In a milling machine having a column including front and rear walls and a cutter spindle journaled at opposite ends in said walls, the combination of means for rotating said spindle at variable rates including a high speed gear and a low speed gear attached to said spindle, a shaft journaled in said walls parallel to the spindle and a gear carried by said shaft in constant mesh with said high speed gear, a sleeve mounted on said shaft and having a gear integrally formed on one end for engagement with said low speed gear, clutch means formed on the other end of said sleeve for operative engagement with the gear mounted on said shaft, a slidable gear couplet splined on said sleeve, a prime mover, a plurality of shiftable gears driven by said prime mover at a constant rate, an intermediate shaft having a plurality of gears fixed thereon for selective engagement by said plurality of gears and by said shiftable gear couplet, fluid operable means for shifting said sleeve, said shiftable gear couplet and said plurality of shiftable gears, said fluid operable means being effective to prevent movement of the sleeve during movement of the shiftable gear couplet or movement of the shiftable gear couplet during movement of the sleeve.

12. In a milling machine having a column, a cutter spindle journaled in the column and a prime mover for driving said spindle, the combination of a fluid operable clutch and a fluid shiftable variable speed transmission for connecting the prime mover to the spindle, a source of fluid pressure, a control valve for each of said fluid operable devices, a fluid operable locking device for one of said valves and connections therefrom to the other of said valves for effecting operation of the locking device when the valve is in a position to cause operation of the machine.

LESTER F. NENNINGER.
FRED A. HASSMAN.